Patented Mar. 6, 1934

1,949,815

UNITED STATES PATENT OFFICE 1,949,815

MANUFACTURE OF 3-HYDROXYSELENO-NAPHTHENE

Wilhelm Schneider, Dessau in Anhalt, Germany, assignor to Agfa Ansco Corporation, Binghamton, N. Y., a corporation of New York No Drawing. Application April 24, 1933, Serial No. 667,761. In Germany April 27, 1932

2 Claims. (Cl. 260—53)

My present invention relates to the manufacture of 3-hydroxyselenonaphthene and of derivatives thereof.

It is known to prepare 3-hydroxyselenonaphthene in a manner analogous to the preparation of 3-hydroxythionaphthene by causing diazotized anthranilic acid to react on alkalihydroselenide and passing over diselenosalicyclic acid and phenylselenoglycolcarboxylic acid. This method, however, is associated with the drawback that the introduction of selenium is much more difficult than that of sulphur, so that the 3-hydroxyselenonaphthene could only be obtained in a poor yield.

According to this invention I have found that the introduction of selenium can be considerably facilitated when reacting with seleno-potassium cyanide on a diazotized ester of anthranilic acid or the ester of a substituted anthranilic acid. Accordingly there is obtained the unsubstituted hydroxyselenonaphthene or an hydroxyselenonaphthene substituted by alkyl, or aryl, or halide, or amino groups, or substituted amino groups, for instance, acylamino groups or alkylamino groups, or hydroxy groups, or alkoxyl, or sulpho groups.

For the preparation of the compounds a diazotized ester of an anthranilic acid, after reducing the acidity by the addition of sodium acetate, is acted upon with potassium cyanide and selenium. The precipitate formed is saponified by treating it with caustic soda solution and is converted by means of monochloracetic acid into ortho-carboxyphenyl-selenoglycolic acid, from which the 3-hydroxyselenonaphthene is obtained in known manner by boiling with acetic acid anhydride and subsequent saponification.

The following example illustrates the invention:

154 grams of the methyl ester of anthranilic acid are diazotized in a mixture of: 500 cc. of water, 240 cc. of concentrated hydrochloric acid and 70 grams of sodium nitrite, whereupon the mineral acid is eliminated by the addition of sodium acetate. This solution is slowly run into a solution of 65 grams of potassium cyanide, 400 cc. of water and 79.2 grams of selenium.

The deposit which precipitates after some time is boiled until completely saponified, in 1200 cc. of a 10 per cent caustic soda solution and, after cooling the solution, is gently heated with 150 grams of the sodium salt of monochloracetic acid. On acidifying the solution the orthocarboxyphenylselenoglycolic acid is precipitated in form of a white deposit which by boiling with acetic acid anhydride and subsequent saponification is converted into the 3-hydroxyselenonaphthene.

What I claim is:

1. A manufacture of a 3-hydroxyselenonaphthene which comprises reacting with potassium cyanide and selenium on a diazotized ester of an anthranilic acid, saponifying the reaction product, treating the saponified product with monochloracetic acid and transforming the product thus obtained into the 3-hydroxynaphthene by boiling with acetic anhydride and subsequent saponification.

2. A manufacture of 3-hydroxyselenonaphthene which comprises diazotizing the methyl ester of anthranilic acid by means of a solution of water, hydrochloric acid and sodium nitrite, eliminating the mineral acid by the addition of sodium acetate, mixing the solution obtained with a solution of potassium cyanide and selenium in water, saponifying the precipitate obtained by a caustic soda solution, heating the reaction product with monochloracetic acid, boiling the orthocarboxyphenylselenoglycolic acid obtained with acetic anhydride and converting the reaction product into 3-hydroxyselenonaphthene by subsequent saponification.

WILHELM SCHNEIDER.